United States Patent [19]

Ash

[11] 4,276,725
[45] Jul. 7, 1981

[54] METHOD AND APPARATUS FOR RELEASING AN ELEVATED PRESSURE DEVELOPED BEHIND A WALL

[76] Inventor: John E. Ash, P.O. Box 3, Benicia, Calif. 94510

[21] Appl. No.: 56,906

[22] Filed: Jul. 12, 1979

[51] Int. Cl.³ .............................................. E04H 9/00
[52] U.S. Cl. ........................................ 52/1; 49/141; 49/466; 52/98
[58] Field of Search ................. 49/141, 466; 52/1, 98; 98/32 R; 16/DIG. 13

[56] References Cited

U.S. PATENT DOCUMENTS

| 2,358,143 | 9/1944 | Castor | 49/141 X |
| 3,150,749 | 9/1964 | Robrecht et al. | 52/1 |
| 3,204,585 | 9/1965 | Carlisle | 52/1 X |
| 3,332,175 | 7/1967 | Hawes et al. | 52/1 |
| 4,022,117 | 5/1977 | Mallian | 49/141 X |
| 4,033,247 | 7/1977 | Murphy | 49/141 X |

FOREIGN PATENT DOCUMENTS

| 608479 | 9/1948 | United Kingdom | 49/141 |
| 1222761 | 2/1971 | United Kingdom | 16/DIG. 13 |

*Primary Examiner*—Alfred C. Perham
*Attorney, Agent, or Firm*—Flehr, Hohbach, Test

[57] ABSTRACT

Method and apparatus for relieving an elevated pressure behind a wall. The apparatus includes a rigid frame mountable over an orifice in the wall and a rigid panel sized to fit within the opening in the frame and to cover the orifice. The panel is mounted in the frame by a hinge which permits the panel to pivot with respect to the frame. The panel is also releasably secured to the frame so that when an elevated pressure is not present, the panel and frame are secured against fluid leakage. If an elevated pressure is developed behind the wall, the panel pivots with respect to the frame and thereby releases the elevated pressure.

17 Claims, 5 Drawing Figures

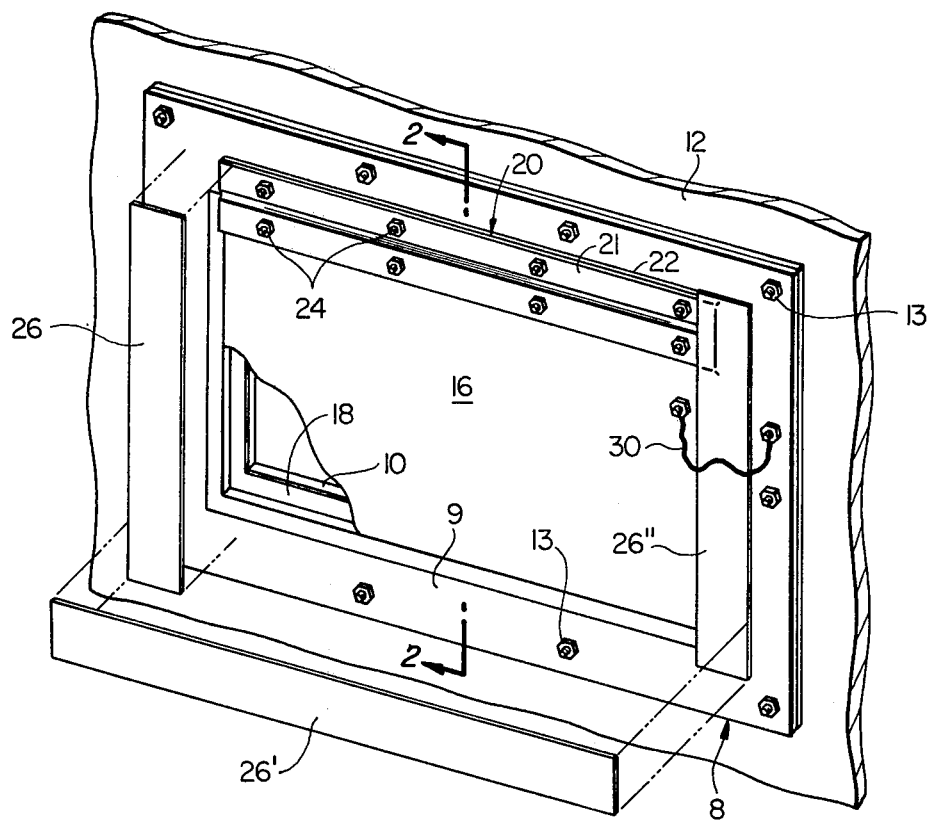
FIG_1
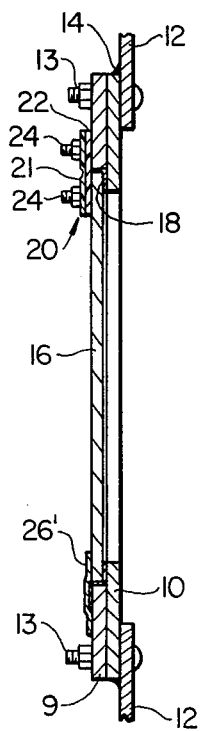
FIG_2
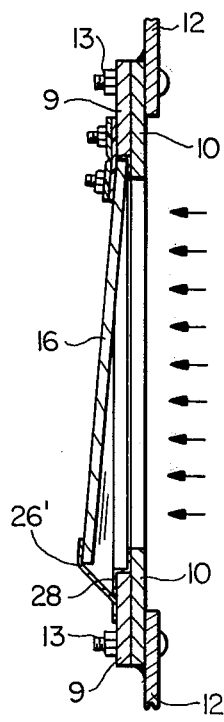
FIG_3
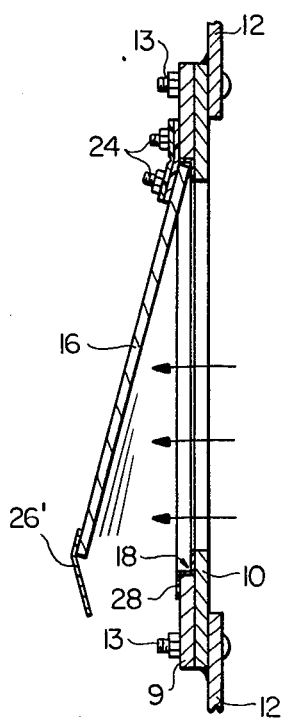
FIG_4
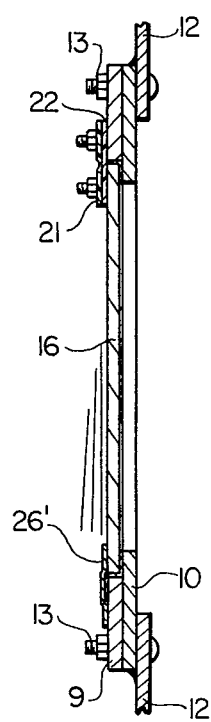
FIG_5

METHOD AND APPARATUS FOR RELEASING AN ELEVATED PRESSURE DEVELOPED BEHIND A WALL

This invention generally relates to apparatus for releasing elevated pressures and, more particularly, to apparatus for releasing explosive pressures by venting large spaces such as ducts, plenums, and rooms.

At the present time metal pressure release panels are used to vent the elevated pressures which occur in enclosed environments where dust, gasses, and hazardous fumes collect. These panels generally have the shape of a four sided pyramid and are scored along the intersection of the sides. When an elevated pressure occurs, the panel expands outward, producing a large hole in the wall of the structure.

Although these panels are widely used and reliably open within prescribed pressure limits, they are designed for one-time use and must be replaced after each explosion. On large installations the replacement of such panels may take days. Further, since these panels do not re-seal after an explosion, the vent hole that is formed permits oxygen to enter the structure and to support the combustion which originally caused the explosion. These systems are also costly because they require the purchase of replacement panels, have recurring installation needs, and cause substantial downtime for the facility.

Another system that is currently in use is a clear plastic roof vent. The vent melts at approximately 180° F. and releases any elevated pressure that is developed behind it. Although this vent is acceptable in the circumstances of fire, it does not open quickly enough to be acceptable in an explosive situation. It is typical to require pressure release panels to open at a pressure of between ¾ to 1 psi.

It is an object of the present invention to release explosive gasses and elevated pressures for safety and protective purposes. The apparatus is designed to protect personnel, operating equipment and structures from damage due to explosions and fire. The apparatus can be installed in airpollution control devices, duct work, ventilation systems, emission control systems, dust control and collection equipment, spray rooms or spray booths, roofs and walls of structures, bag houses and in scientific laboratories.

It is another object of the present invention to vent the elevated pressure as rapidly as possible. This object is achieved by using a lightweight hinged panel which has minimal inertia. This object is also achieved by placing a non-stick surface around three sides of the margin of the opening of the frame and securing the panel of the frame with an adhesive tape that contacts but does not bond to the non-stick surface of the frame. The tape bonds to the other surfaces of the panel and frame. When an elevated pressure develops, opening of the panel is initiated by first pulling up the tape from the non-stick surface so that the panel initially develops sufficient momentum to pull up the remaining adhesive tape from the surface of the frame.

A further object of the present invention is to re-seal the vented space immediately after venting. The apparatus is designed to minimize the entry of oxygen into the structure after an explosion and thereby minimize the threat of fire.

This object is achieved by using a hinged panel that shuts immediately after venting. The panel is urged shut by the hinge which secures the panel to the frame.

An additional object of the present invention is to permit re-use of the apparatus. The system is designed with an optimum fiberglass laminant and hinge structure to withstand multiple explosions and to provide continuous and repeated operation. The apparatus withstands high impact forces and is not subject to fracture or failure due to shock and blast effects.

A further object of the present invention is to seal the apparatus against fluid leakage while permitting immediate venting of an elevated pressure developed behind the apparatus. In most applications the apparatus is placed on a wall behind which a vacuum is developed and any fluid leakage represents a loss of efficiency. This object is achieved by use of an adhesive tape and a hinge that seals the common margins between the panel and the frame.

The apparatus is designed for continuous operation in severe environments. The apparatus is designed to operate either indoors or outdoors and is resistant to corrosion on all of its surfaces. This object is achieved by fabricating the apparatus from fiberglass and using a fire retardant, corrosive resistant resin. The apparatus also includes a non-mechanical hinge that will not corrode or mechanically bind. Moreover, the apparatus has the following characteristics: high corrosion resistance to acid and alkali materials; electrically non-conductive and non-sparking; fire retardant; thermally insulating; high resistance to impact; low cost and low maintenance; high strength to weight ratio; and capable of continuous operation at temperatures above 400° F.

These objects and features are achieved by an apparatus for releasing an elevated pressure developed behind a wall.

The apparatus includes a rigid frame mountable over an orifice in a wall and having an opening that corresponds to the orifice. The apparatus further includes a rigid panel sized to fit within the opening in the frame and to cover the orifice. The rigid panel is pivotally mounted along one margin of the frame by a hinge. The apparatus further includes means for releasably securing the panel to the frame so that the panel and frame are secured against fluid leakage when an elevated pressure is not present and so that if an elevated pressure is developed behind the wall, the panel will pivot with respect to the frame and thereby release the elevated pressure.

Additional objects and features of the invention will appear from the following description in which the preferred embodiment has been set forth in detail in conjunction with the accompanying drawings:

FIG. 1 is a perspective view, exploded and broken away, of an apparatus for releasing an elevated pressure developed behind a wall according to the present invention.

FIG. 2 is a side elevational view, broken away and in section, taken along line 2—2 of FIG. 1.

FIGS. 3–5 are side elevational views of the apparatus of FIG. 2 illustrating the opening and closing operation of the apparatus.

Referring to FIGS. 1 and 2, the apparatus includes a rigid frame 8 that is mountable over an orifice in wall 12. The frame has an opening that corresponds to the orifice. The frame in the preferred embodiment is fabricated from two layers 9, 10 of fiberglass mat, woven roving and a corrosive, fire retardant resin. One such resin is Dion 6693 which is available from the Koppers Company of Pittsburgh, Pa. The two layers are fabricated separately and then bonded together into one unitary structure. The frame is mounted on a wall 12 which can be the side wall of a duct or a dust collector. The frame is secured to the wall by a plurality of bolts 13 and is made fluid tight by caulking 14 placed in the normal manner.

The apparatus of FIG. 1 further includes a rigid rectangular panel 16 which is sized to fit within the opening in the frame. Referring to FIG. 2 it can be seen that the front layer 9 of the frame has a larger opening than the rear layer 10 of the frame. In FIG. 2 the front layer 9 of the frame is illustrated to the left of the rear layer 10. The difference in the sizes of the openings forms a ledge 18, FIG. 4 within which the rigid panel 16 fits. The ledge also prevents the panel from swinging in to the duct or clockwise about the bolt 24 as illustrated in FIG. 2. Like the frame, the panel is fabricated from woven roving, fiberglass, and a corrosive, fire retardant resin such as Dion 6693. In addition, both the frame and the panel are molded with the gelcoat an integral part of the laminate for improved weathering properties.

The panel 16, FIG. 2 is mounted to the frame 8 along one margin by a hinge assembly 20. The hinge assembly comprises a polypropylene hinge 21 of commercial construction that is biased to urge the panel 16 against the frame 9. The polypropylene hinge is located on the exterior surface of the assembly for improved weather resistance and to secure the apparatus against fluid leakage during operation.

The hinge assembly 20 also includes an underlying fiberglass reinforced hinge 22 located between the polypropylene hinge 21 and the panel 16 and frame 8. The fiberglass hinge consists of woven fiberglass cloth tape which has its two longitudinal margins sealed with resin. The resin bonds the margins of the tape and prevents it from tearing.

The fiberglass hinge provides a backup for the polypropylene hinge as well as thermally insulating it from elevated temperatures. In addition, it should be noted in FIG. 2 that the layers 9 and 10 and the panel 16 insulate the hinge assembly 20 from elevated temperatures and permit operation of the hinge assembly under extreme temperature conditions. These elevated temperatures normally occur on the right side of the apparatus as illustrated in FIG. 2. Typically such fiberglass hinges can operate up to 2200° F. whereas polypropylene hinges commence to fail above 200° F.

The hinge assembly 20, FIG. 2 is secured to the panel 16 and the frame 9, 10 by a plurality of stainless steel bolts 24. It should be noted that the bolts securing the panel to the hinge assembly are substantially shorter than the bolts securing the hinge to the frame. When the panel 16 opens as illustrated in FIG. 4, the tips of the opposing bolts come in contact and serve as panel pivoting stops. These stops prevent the panel from pivoting 180° in arc and interfering with adjacent panels (not shown).

It should be understood that either the polypropylene hinge 21 or the fiberglass hinge 22 has sufficient strength to withstand the opening forces and shock waves on the panel. Each hinge can operate satisfactorily if the other fails. The hinge assembly is used in order to provide further safety to the apparatus through redundance.

It should also be noted that the hinge assembly 20 does not include any mechanically engaging parts which could either corrode or bind up. Such parts could prevent the smooth opening of the panel if an elevated pressure were developed behind the wall 12.

The panel 16, FIG. 1, 2 is releasably secured to the frame 8 by a plurality of adhesive tapes 26, 26', 26''. The adhesive tapes secure the panel and the frame against fluid leakage when an elevated pressure is not developed behind the wall 12. Under normal circumstances a vacuum is maintained behind the wall and the adhesive tapes seal the panel and frame against leakage. In the preferred embodiment an outdoor weathering, 3 mil thick polyester tape is used. The tape must be selected so that it does not permanently bond to the frame and panel. The adhesive tape should have high resistance to corrosion and weather and be one that does not develop increased stickiness with age. One example of such a tape is the acrylic-backed adhesive tape No. 8450 whitch is available from Minnesota Mining & Manufacturing Company of Minneapolis, Minn.

Referring to FIG. 4, the ledge 18 formed by the front layer 9 and the rear layer 10 of the frame is covered with a non-stick surface 28. This surface also extends beyond the edge of the opening of the front layer 9 and covers a portion of the margin of the front layer. In the preferred embodiment this non-stick surface is formed by placing Teflon coated tape on the surface of the ledge and around the margin of the front layer 9 to a distance of approximately ½ inch back from the edge of the opening. The width of the tape may be varied to control the pressure at which the panel opens as described below.

The purpose of the non-stick surface is to facilitate the opening of the panel 16. The non-stick surface ensures that any foreign materials that become lodged between the panel and the ledge do not bond the panel to the frame when release of the panel from the frame is required. In addition, the non-stick surface does not bond to the adhesive tape 26 and permits the tape to be quickly pulled up from the frame during periods of elevated pressure. This releasing mechanism is shown in FIGS. 3 and 4. The adhesive tape 26 is selected to bond only to the surface of the frame beyond the non-stick surface and to the panel 16. The width of the non-stick surface on the front of the frame is chosen so that when the panel 16 begins opening, the panel develops sufficient momentum to rapidly force the release of the remaining adhesive tape from the surface of the frame.

Referring to FIG. 1, the apparatus further includes a catch wire 30 that runs from the bolt on the panel 16 to one of the bolts 13 that attaches the frame to the wall 12. The catch wire is used as a backup in case the hinge assembly 20 ruptures during an explosion. In that case the wire catches the panel and prevents it from being separated from the frame. The panel can thereafter be reattached to the frame using a new hinge assembly.

To place the apparatus into operation, the frame 8, FIG. 1 is first bolted to the wall 12 so that the panel 16 opens outward or to the left as illustrated in FIG. 2. The frame is secured in place by a plurality of bolts 13 and then is caulked to ensure that a fluid tight seal is formed. The hinge assembly 20 urges the panel 16 into the closed position as illustrated in FIG. 2. The panel and the frame are sealed against fluid leakage by securing the three adhesive tapes 26, 26', 26'' along the three margins opposite the hinge assembly. The polypropylene hinge seals the fourth edge. The apparatus is designed so that the panel and frame are secured against fluid leakage when an elevated pressure is not present behind the wall 12. If a vacuum is present behind the wall, the caulking 14, the hinge assembly 20, and the adhesive tapes 26 ensure that the apparatus is fluid tight. FIG. 2 illustrates the position of the components during operation when an elevated pressure is not present.

If an elevated pressure is developed behind the wall 12, FIG. 2, the panel 16 commences to open immediately at the onset of the first shock wave. The three adhesive tapes 26, 26', 26" immediately pull up from the non-stick surface 28 of the frame and the panel commences to swing outward, counterclockwise about the hinge assembly. The initial motion causes the panel to develop sufficient momentum to pull the remainder of the adhesive tape off of the surface of the frame which does not have the non-stick surface. FIG. 3 illustrates the panel after it has pulled up the adhesive tape from the non-stick surface and as it begins to pull the tape up from the surface of the frame where the tape is bonded. Next, the adhesive tape 26 is released from the frame and the panel 16 continues to pivot about the frame using the hinge assembly 20. This pivoting motion, which is illustrated in FIG. 4, continues until the bolts 24 come into contact and stop the motion. The bolts prevent the panel from swinging 180° in arc and interfering with any adjacent panels which may be opening simultaneously.

As soon as the elevated pressure is vented by the apparatus, the polypropylene hinge urges the panel shut as illustrated in FIG. 5. The panel shuts in order to prevent air from entering the duct and supporting any combustion that may accompany the explosion. The adhesive tape 26 may or may not re-adhere to the frame but in any case it does not interfere with the closure of the panel. After each explosion, the tape is usually replaced. The panel, hinge, and frame, however, are used again and again.

In tests run on one embodiment of the apparatus the panel opened and re-sealed within 1/24 of a second. The panel opened when the over pressure reached ¼ psi. Testing has also shown the panels can withstand repeated blasts (20 to 40).

The apparatus is designed to open up and vent any elevated pressure, shock wave or explosion force as quickly as possible. If the force of the explosion is vented quickly enough, the equipment and walls of the system are not damaged. The speed of venting is critical because the pressure builds up at a very fast rate during an explosion.

Although the best mode contemplated for carrying out the present invention has been herein shown and described, it will be apparent that modification and variation may be made without departing from what is regarded to be the subject matter of the invention.

What is claimed is:

1. Apparatus for releasing an elevated pressure developed behind a wall, comprising:
    (a) a rigid frame mountable over an orifice in a wall, said frame having an opening that corresponds to the orifice;
    (b) a rigid panel sized to fit within the opening in the frame and to cover the orifice;
    (c) hinge means pivotally mounting the panel to the frame along one margin and in registration with the orifice;
    (d) means, attachable between the frame and the panel, for releasably securing the panel to the frame so that the panel and frame are secured against fluid leakage when an elevated pressure is not present and so that, if an elevated pressure is developed, the panel will release and pivot with respect to the frame using the hinge, thereby releasing the elevated pressure; and
    (e) a margin forming part of said panel and extending around the opening in the latter, said margin having a non-stick surface so that foreign materials cannot bond the panel to the frame and prevent pivoting of the panel during periods of elevated pressure.

2. An apparatus as in claim 1 wherein said hinge means is a polypropylene hinge and is biased to urge the panel against the frame so that after the elevated pressure is released, the panel returns to substantially seal the orifice.

3. An apparatus as in claim 1 wherein said hinge means is fabricated from fiberglass cloth and resin and is able to withstand temperatures above 200° F.

4. An apparatus as in claim 1 wherein the hinge means is mounted on the exterior surface of the panel and frame so that the panel and frame thermally insulate the hinge means from elevated temperatures occurring on the interior surface of the panel and frame.

5. An apparatus as in claim 1 wherein a vacuum is developed behind the wall when an elevated pressure is not present and wherein the securing means seals the panel and frame against fluid leakage so that the vacuum can be maintained.

6. An apparatus as in claim 1 further including a plurality of panel pivoting stops which secure the hinge both to the panel and to the frame and which prevent the panel from pivoting 180° in arc if an elevated pressure develops.

7. Method for releasing an elevated pressure developed behind a wall, comprising the steps of:
    (a) covering an orifice in a wall with both a rigid frame having an opening that corresponds to the orifice and a rigid panel sized to fit within the opening in the frame and to cover the orifice, said panel being pivotally mounted along one margin to the frame;
    (b) placing a non-stick surface around the margin of the opening of the frame;
    (c) securing the panel to the frame with an adhesive tape that contacts but does not bond to the non-stick surfaces of the frame, said tape bonds to the other surfaces of the panel and frame;
    (d) initiating a quick and positive release of the panel from the frame when an elevated pressure develops by first pulling up the adhesive tape from the non-stick surface so that the panel initially develops momentum and thereafter pulling up the remaining adhesive tape from the surface of the frame;
    (e) pivoting the panel with respect to the frame using a hinge after releasing the panel from the frame so that the elevated pressure is released; and
    (f) re-securing the panel to the frame with an adhesive tape after the elevated pressure has been released.

8. A method as in claim 7 including the step of urging the panel against the frame using the hinge so that after the elevated pressure is released, the panel returns to substantially seal the orifice.

9. An apparatus for releasing an elevated pressure developed behind a wall, comprising:
    (a) a rigid frame mountable over an orifice in a wall, said frame having an opening that corresponds to the orifice;
    (b) a rigid panel sized to fit within the opening in the frame and to cover the orifice;

(c) hinge means pivotally mounting the panel to the frame along one margin and in registration with the orifice;

(d) means, attachable between the frame and the panel, for releasably securing the panel to the frame so that the panel and frame are secured against fluid leakage when an elevated pressure is not present and so that, if an elevated pressure is developed, the panel will release and pivot with respect to the frame using the hinge, thereby releasing the elevated pressure;

(e) a margin forming part of and extending around the opening of the frame, said margin having a non-stick surface; and (f) said securing means being an adhesive tape which does not bond to said non-stick surface but bonds to the other surfaces on the panel and the frame so that if a period of elevated pressure develops, the tape quickly releases from the non-stick surface and the panel develops sufficient momentum to pull the tape away from the surfaces to which the tape is bonded.

10. An apparatus as in claim 9 wherein the panel and frame can be re-used after a period of elevated pressure to seal the orifice against fluid leakage.

11. An apparatus for releasing an elevated pressure developed behind a wall through an opening in said wall, said apparatus comprising:

(a) a rigid frame mountable to the front face of said wall circumferentially around said opening;

(b) a rigid panel sufficiently large to close said opening and having an outermost peripheral edge, said panel being pivotally connected along one section of said edge to an adjacent section of said frame for movement between (i) a first position such that the remaining unconnected section of said edge rests against the remaining unconnected section of said frame for closing said opening, and (ii) a second position such that said unconnected edge and frame sections are spaced from one another for venting said opening; and (c) means connected with said remaining unconnected panel edge section and releasably connected with said remaining unconnected frame section in a way which allows said panel to pivot freely a limited distance from said first position towards but short of said second position whereby to aid in the release of said means from said unconnected frame section in response to predetermined elevated pressures behind said wall.

12. An apparatus as in claim 11 including hinge means formed from fiberglass material fixedly connected along the length of and to said pivotally connected panel edge section and frame section for providing the pivotal connection therebetween and fluid seal means mounted over said hinge means.

13. An apparatus as in claim 12 wherein said fluid seal is a fluid impervious plastic hinge mounted over and connected with said hinge means.

14. An apparatus as in claim 11 wherein said unconnected frame section and panel edge section together define a joint therebetween when said panel is in said first position and wherein said last-named means serves to seal said joint when said panel is in said first position.

15. An apparatus for releasing an elevated pressure developed behind a wall through an opening in said wall, said apparatus comprising:

(a) a rigid frame mountable to the front face of said wall circumferentially around said opening;

(b) a rigid panel sufficiently large to close said opening and having an outermost peripheral edge, said panel being pivotally connected along one section of said edge to an adjacent section of said frame for movement between (i) a first position such that the remaining unconnected section of said edge rests against the remaining unconnected section of said frame for closing said opening, and (ii) a second position such that said unconnected edge and frame sections are spaced from one another for venting said opening;

(c) hinge means formed from fiberglass material fixedly connected along the length of and to said pivotally connected panel edge section and frame section for providing the pivotal connection therebetween; and (d) fluid seal means extending entirely around the circumferential joint formed between said panel and frame, said seal means including first seal means fixedly connected over and against said hinge means and a second seal means connected with said remaining unconnected panel edge section and said remaining unconnected frame section in a way which allows said remaining panel edge section to become free from said remaining frame section in response to predetermined elevated pressures behind said wall for venting said opening.

16. An apparatus as in claim 15 wherein said first seal means includes a fluid impervious plastic hinge mounted over and to said hinge means.

17. An apparatus for releasing an elevated pressure developed behind a wall through an opening in said wall, said apparatus comprising:

(a) a rigid frame mountable to the front face of said wall circumferentially around said opening;

(b) a rigid panel sufficiently large to close said opening and having an outermost peripheral edge, said panel being pivotally connected along one section of said edge to an adjacent section of said frame for movement between (i) a first position such that the remaining unconnected section of said edge rests against the remaining unconnected section of said frame for closing said opening, and (ii) a second position such that said unconnected edge and frame sections are spaced from one another for venting said opening; and (c) fluid seal means connected with said remaining unconnected panel edge section and releasably connected with said remaining unconnected frame section in a way which fluid seals the joint therebetween and which allows said panel to pivot from said first position to said second position in response to predetermined elevated pressures behind said wall, said means and said remaining unconnected frame section being such that said means can be releasably connected to the latter in a fluid sealed manner after releasing, as a result of said predetermined pressures.

* * * * *